Patented Nov. 27, 1951

2,576,379

UNITED STATES PATENT OFFICE 2,576,379

CERAMIC DIELECTRICS COMPRISING ESSENTIALLY TITANIA

Jack Woodcock and John Kenneth Paridge, Stourport-on-Severn, England, assignors to Steatite and Porcelain Products Limited, a corporation of Great Britain No Drawing. Application July 20, 1948, Serial No. 39,808. In Great Britain August 6, 1947

9 Claims. (Cl. 106—39)

This invention relates to ceramic dielectrics comprising essentially titania, either uncombined or combined with one or more of the oxides of magnesium, calcium, strontium or barium.

According to the present invention we provide improved ceramic dielectrics comprising essentially titania and optionally magnesia and/or one or more of the alkaline earth oxides, CaO, SrO, and BaO, characterized by the presence in the said dielectrics of cobalt oxide in amounts equivalent to not more than 15% cobaltocobaltic oxide, $Co_3O_4$.

Preferably the cobalt oxide content does not exceed the equivalent of 5% cobaltocobaltic oxide, the optimum amounts apparently being from 1–3%.

Bodies in accordance with the invention may also contain with advantage up to 15% zirconia, and/or up to 2% of tungstic and/or molybdic oxides. Where magnesia is present it may be necessary or desirable to limit the zirconia content to not more than about 5% to allow adequate resistance to thermal shock.

Bodies in accordance with the invention are produced in the customary way by first preparing a fine-milled powder from which the articles are formed and fired. In preparing the powder, the ingredients are wet-mixed, milled with water, dried, and crushed. The powder is then mixed with an organic plasticiser, for example flour paste, which is subsequently burned out in firing. The plastic mass is shaped by extrusion or other forming processes commonly known in industry to form tubes, plates or other articles which after drying out are fired at a temperature of 1400° C. or in accordance with the requirements of the particular type of body being fired as will be understood in the industry.

The ingredients from which the bodies are to be produced may be the separate oxides, i. e. cobalt oxide, titania, zirconia, magnesia, and the alkaline earth oxides. For the purposes of the invention ordinary commercial black cobalt oxide consisting mainly of cobaltocobaltic oxide $Co_3O_4$ is a suitable material. Alternatively, the respective oxides may be replaced by equivalent amounts of other compounds capable of producing or reacting as the oxides during the firing process, as for example the carbonates of magnesium and the alkaline earths. Alternatively again, some or all of the ingredients of the body may themselves be preformed from oxides. Thus the simplest body composition would be made from titania and cobalt oxide, but when say, zirconia is also to be present, the cobalt oxide and zirconia may be pre-formed to cobalt zirconate, and the body made from titania and cobalt zirconate. Again, where magnesia and/or alkaline earth oxides are to be included they may be added in the form of magnesium zirconate, or magnesium or alkaline earth titanate.

Table 1 shows the composition, in terms of oxides present of a number of ceramic bodies in accordance with and illustrative of our invention, whilst Table 1A shows the nominal composition of the same bodies.

TABLE 1

*Per cent composition as oxides*

| Oxides | Body No. | | | | | | |
|---|---|---|---|---|---|---|---|
| | 1 | 2 | 3 | 4 | 5 | 6 | 7 |
| Titania, $TiO_2$ | 99.75 | 95.0 | 95.0 | 49.25 | 30.8 | 38.18 | 65.25 |
| Magnesia, MgO | | 0.73 | 0.75 | 50.25 | | | |
| Zirconia, $ZrO_2$ | | 2.27 | 3.55 | | | | |
| Calcia, CaO | | | | | 5.35 | | |
| Strontia, SrO | | | | | 8.47 | | |
| Baria, BaO | | | | | 59.2 | 46.0 | 33.75 |
| Cobalt Oxide, $Co_3O_4$ | 0.25 | 2.0 | 0.82 | 0.5 | 10.0 | 2.0 | 1.0 |

TABLE 1A

*Per cent nominal composition*

| Ingredients | Body No. | | | | | | |
|---|---|---|---|---|---|---|---|
| | 1 | 2 | 3 | 4 | 5 | 6 | 7 |
| Titania | 99.75 | 95.0 | 95.0 | | | | 47.65 |
| Magnesia | | | | 0.67 | | | |
| Magnesium Zirconate, $MgZrO_3$ | | 3.0 | 3.0 | | | | |
| Magnesium Orthotitanate, $Mg_2TiO_4$ | | | | 98.83 | | | |
| Calcium Titanate, $CaTiO_3$ | | | | | 13.0 | | |
| Strontium Titanate, $SrTiO_3$ | | | | | 15.0 | | |
| Barium Titanate, $BaTiO_3$ | | | | | | 90.0 | 70.0 | 51.35 |
| Cobalt Oxide | 0.25 | 2.0 | | 0.5 | 10.0 | 2.0 | 1.0 |
| Cobalt Zirconate, $CoZrO_3$ | | | 2.0 | | | | |

Various kinds of bodies falling within the scope of our invention are represented inter alia by the bodies illustrated in Tables 1 and 1A. Thus bodies Nos. 1 and 2 are representative of titania/cobalt oxide bodies, whilst body No. 3 represents titania/cobalt zirconate bodies. Magnesium titanate bodies are represented by body No. 4, alkaline earth titanate bodies by bodies Nos. 5 and 6, and mixed titania/alkaline earth titanate bodies by No. 7. Various other combinations of the oxides shown in Table 1 can also be made in accordance with our invention with the advantages to be derived therefrom.

Table 2 shows the dielectric constants and power factors at room temperature of the bodies enumerated 1-7 in Tables 1 and 1A. The figures in parentheses indicate the corresponding electrical properties of other bodies not in accordance with the present invention but of comparable types.

TABLE 2

| Body No. | Dielectric Constant | Power Factor $+10^{-4}$ | |
|---|---|---|---|
| | | 1 Kilocycle | 2 Megacycles |
| 1 | 109 (99) | 14 (30-40) | Less than 1 (2-5). |
| 2 | 89 (80-90) | 6 (40-300+) | Less than 1 (3-10). |
| 3 | 89 (80-90) | 4 (40-300+) | Less than 1 (3-10). |
| 4 | 15 (12-18) | 5 (10-20) | Less than 1 (2-5). |
| 5 | 1180 (1570) | 10 (260) | |
| 6 | 2500 (11,200) | 10 (70) | |
| 7 | 35 (25-100) | 7 (10-30) | 2.8 (1.5-8). |

TABLE 3

| Temperature, ° C. | Dielectric Constant, 5 volts at 1 Kc. | |
|---|---|---|
| | Body No. 5 | Body No. 6 |
| 20 | 1,190 | 2,500 |
| 30 | 1,280 | 2,275 |
| 40 | 1,390 | 2,000 |
| 50 | 1,550 | 1,775 |
| 60 | 1,850 | 1,575 |
| 70 | 2,100 | 1,400 |
| 80 | 2,240 | 1,225 |
| 90 | 2,290 | 1,075 |
| 100 | 2,280 | 960 |
| 110 | 2,250 | 860 |
| 120 | 2,200 | 775 |

Table 3 indicates the dielectric constants of the alkaline earth titanate bodies Nos. 5 and 6 shown in Tables 1, 1A and 2 at various temperatures at low frequency, and conjointly with the power factor data given in Table 2 illustrates the improved electrical properties of alkaline earth titanate bodies produced in accordance with our invention as compared with the well-known high-peaking dielectric constant characteristics and higher power factors of the commonly known alkaline earth titanate bodies.

The addition of cobalt oxide or its equivalent to bodies in accordance with our invention has several advantages. Thus the cobalt oxide acts as a flux, although when present only in very small amounts, for example of the order of 0.25% it may not be self-sufficient in this respect unless firing is conducted at a somewhat higher temperature than would be suitable with greater quantities of the cobalt oxide or supplementary fluxes. The addition of from 1-2% of cobalt oxide to alkaline earth titanate bodies reduces their firing temperatures by 50-200° C. for a given firing cycle. Body No. 7 in the tables may be taken by way of example, having been fired at 1200° C., whereas in the absence of the cobalt oxide a temperature of the order of 1350° C. would be necessary.

The elimination of conventional fluxes gives inherently lower power factors at both high and low frequencies, and the lower power factors at high frequency are of primary importance in bodies which in service are likely to be highly stressed at high frequency. In the case of bodies comprising mainly or substantially the alkaline earth titanates, the addition of cobalt oxide or its equivalent has the effect of modifying not only their power factors but also their dielectric constant/temperature curves by minimising and/or displacing the peaks on the curves on the temperature scale, thereby enabling closer control of their temperature coefficients. Other materials, for example magnesium zirconate have been proposed for addition to alkaline earth titanate bodies for similar effects, but cobalt oxide has the further advantage that firing conditions are less troublesome.

It would appear that when both cobalt oxide and zirconia are present in the bodies, the temperature coefficient of their power factor is considerably lower than in most dielectrics of the rutile type. Thus, a body containing both cobalt oxide and zirconia has a power factor at 2 megacycles per second of $2 \times 10^{-4}$ at 20° C., increasing by about 5% at 80°, and a power factor at 1 kilocycle per second of about $12 \times 10^{-4}$ at 20°, increasing by about 15% at 80° C. In the absence of the cobalt oxide and zirconia, the corresponding power factors showed increases of 200% and more.

Good results are obtained when the bodies in accordance with the invention are fired under reducing conditions such as are employed in the firing of hard porcelain. Under such conditions, titania normally tends to assume the well-known semi-conducting form, when its dielectric properties are of course greatly impaired, but such tendency is minimised or completely inhibited in the presence of the cobalt oxide.

We claim:

1. A dielectric body constituting the product resulting from the firing of a powdered mixture comprising predominantly titania and containing cobalt oxide in a quantity not greater than 15% by weight.

2. A dielectric as claimed in claim 1, wherein the cobalt oxide is present in 0.25 to 15% by weight.

3. A dielectric as claimed in claim 1, containing zirconia in an amount up to 15% by weight.

4. A dielectric body comprising a fired product resulting from the firing of a mixture of ingredients, said product having, in terms of oxides present, the composition:

| | Per cent |
|---|---|
| $Co_3O_4$ | 0.25 to 15 |
| $ZrO_2$ | 0 to 15 |
| $WO_3$ | 0 to 2 |
| $MoO_3$ | 0 to 2 |
| $MgO$ | 0 to 50.25 |
| $CaO$ | 0 to 5.35 |
| $SrO$ | 0 to 8.47 |
| $BaO$ | 0 to 59.2 |
| $TiO_2$ | 30.8 to 99.75 | the percentages being by weight.

5. A dielectric body constituting the product resulting from the firing of a powdered mixture comprising 0.25 to 5% by weight of cobalt oxide with the remainder of the mixture being substantially titania.

6. A dielectric as claimed in claim 5, wherein the cobalt oxide constitutes 1 to 3% by weight of the fired product.

7. A dielectric body constituting the product resulting from the firing of a powdered mixture comprising predominantly titania and containing an alkaline earth oxide and cobalt oxide with the cobalt oxide content being from 0.25 to 15% by weight.

8. A dielectric body constituting the product resulting from the firing of a powdered mixture comprising predominantly titania and containing cobalt oxide and zirconia in equimolecular proportions with the cobalt oxide being between 0.25 and 15% by weight.

9. A dielectric body constituting the product resulting from the firing of a powdered mixture comprising 0.25 to 15% by weight of cobalt oxide and 0 to 15% by weight of zirconia with the remainder of the mixture being substantially a material selected from the group consisting of magnesium titanate, alkaline earth titanates, mixtures of alkaline earth oxides and titania, and mixtures of magnesium oxide and titania.

JACK WOODCOCK.
JOHN KENNETH PARIDGE.

REFERENCES CITED

The following references are of record in the file of this patent:

UNITED STATES PATENTS

| Number | Name | Date |
|---|---|---|
| 2,027,277 | Habann | Jan. 7, 1936 |